(12) United States Patent
Hunt et al.

(10) Patent No.: US 10,987,825 B2
(45) Date of Patent: Apr. 27, 2021

(54) TOPOLOGICAL INSULATOR NANOTUBE DEVICE AND METHODS OF EMPLOYING THE NANOTUBE DEVICE

(71) Applicant: The Boeing Company, Chicago, IL (US)

(72) Inventors: Jeffrey H. Hunt, Thousand Oaks, CA (US); Angela W. Li, Everett, WA (US); Wayne R. Howe, Irvine, CA (US); Dennis L. Coad, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 477 days.

(21) Appl. No.: 15/815,600

(22) Filed: Nov. 16, 2017

(65) Prior Publication Data
US 2019/0143558 A1    May 16, 2019

(51) Int. Cl.
| | |
|---|---|
| *B33Y 10/00* | (2015.01) |
| *B28B 1/00* | (2006.01) |
| *B28B 17/00* | (2006.01) |
| *B33Y 30/00* | (2015.01) |
| *B33Y 50/02* | (2015.01) |
| *B29C 64/141* | (2017.01) |
| *C04B 35/00* | (2006.01) |

(Continued)

(52) U.S. Cl.
CPC .......... *B28B 1/001* (2013.01); *B28B 17/0081* (2013.01); *B29C 64/141* (2017.08); *B29C 64/209* (2017.08); *B33Y 10/00* (2014.12); *B33Y 30/00* (2014.12); *B33Y 50/02* (2014.12); *C04B 35/00* (2013.01); *B33Y 70/00* (2014.12)

(58) Field of Classification Search
CPC ..................................................... B33Y 10/00
See application file for complete search history.

(56) References Cited

U.S. PATENT DOCUMENTS

| | | |
|---|---|---|
| 5,508,489 A | 4/1996 | Benda et al. |
| 6,815,636 B2 | 11/2004 | Chung et al. |
| 7,515,986 B2 | 4/2009 | Huskamp |

(Continued)

FOREIGN PATENT DOCUMENTS

WO    WO 2013/086227 A1    6/2013

OTHER PUBLICATIONS

Du, "Robustness of topological surface states against strong disorder observed in Bi2Te3 nanotubes". Physical Review B 93, 195402 (2016) (Year: 2016).*

(Continued)

*Primary Examiner* — Jason Berman
(74) *Attorney, Agent, or Firm* — MH2 Technology Law Group LLP

(57) ABSTRACT

The present disclosure is directed to a particle shooter system. The particle shooter system comprises a non-carbon topological insulator nanotube defining a bore extending between first and second ends thereof. A particle shooter is operably coupled with the first end of the non-carbon topological insulator nanotube, and configured to transmit a single particle through the bore of the non-carbon topological insulator nanotube. A positioning mechanism is operably coupled with the non-carbon topological insulator nanotube and configured to aim the non-carbon topological insulator nanotube at a target disposed proximal the second end thereof.

36 Claims, 11 Drawing Sheets

(51) Int. Cl.
  *B29C 64/209* (2017.01)
  *B33Y 70/00* (2020.01)

(56) References Cited

U.S. PATENT DOCUMENTS

| | | | |
|---|---|---|---|
| 8,159,157 B1* | 4/2012 | Imholt | H01J 3/02 |
| | | | 315/500 |
| 9,296,007 B2 | 3/2016 | Li et al. | |
| 9,630,209 B2 | 4/2017 | Hunt et al. | |
| 9,632,542 B2 | 4/2017 | Li et al. | |
| 9,732,418 B2 | 8/2017 | Li et al. | |
| 2010/0140723 A1 | 6/2010 | Kurtz et al. | |
| 2014/0199542 A1 | 7/2014 | Li et al. | |
| 2015/0165556 A1 | 6/2015 | Jones et al. | |
| 2015/0174695 A1 | 6/2015 | Elfstroem et al. | |
| 2015/0255184 A1 | 9/2015 | Li et al. | |
| 2015/0257308 A1 | 9/2015 | Li et al. | |
| 2016/0082617 A1 | 3/2016 | Howe et al. | |
| 2016/0116679 A1 | 4/2016 | Muendel et al. | |
| 2016/0158889 A1 | 6/2016 | Carter et al. | |
| 2016/0168692 A1 | 6/2016 | Li et al. | |
| 2017/0090119 A1 | 3/2017 | Logan et al. | |
| 2017/0173737 A1 | 6/2017 | Gray | |
| 2017/0306476 A1 | 10/2017 | Li | |

OTHER PUBLICATIONS

Ando et al., "Topological Insulator Materials," Journal of the Physical Society of Japan, Invited Review Papers, 2013, pp. 1-36.
Hasan et al., "Colloquium: Topological Insulators," The Amer. Phys. Soc., Reviews of Modern Physics, vol. 82, Oct.-Dec. 2010, pp. 3045-3067.
Hills et al., "From Graphene and Topological Insulators to Weyl Semimetals," WSPC/Instruction File, 2015, pp. 1-33.
Hla, "Single Atom Extraction by Scanning Tunneling Microscope Tip-Crash and Nanoscale Surface Engineering," Nanoscale & Quantum Phenomena Institute, Physics & Astronomy Department, Ohio University, Athens, OH, date unknown, pp. 1-15.
Hla, "STM Single Atom/Molecule Manipulation and Its Application to Nanoscience and Technology," Critical Review article, J. Vac. Sci. Tech, 2005, p. 1-12.
Khanikaev et al., Photonic Topological Insulators, Nature Materials, vol. 12, Mar. 2013, pp. 233-239.
Kong et al., "Opportunities in Chemistry and Materials Science for Topological Insulators and Their Nanostructures," Nature Chemistry, vol. 3, Nov. 2011, pp. 845-849.
Kuzmenko et al., Universal Dynamical Conductance in Graphite, *DPMC, University of Geneva, Switzerland*, 2007, pp. 1-5.
Li et al., "Marginal Topological Properties of Graphene: a Comparison with Topological Insulators," *DPMC, University of Geneva, Switzerland*, 2012, pp. 1-9.
Mak et al., "Optical Spectroscopy of Graphene: From the Far Infrared to the Ultraviolet," Solid State Communications, 152 (2012), 1341-1349.
Mingareev et al., "Laser Additive Manufacturing Going Mainstream," Optics and Photonics News, Feb. 2017, 8 pages.
Moore, "The Birth of Topological Insulators," Nature, vol. 464, Insight Perspective (2010), pp. 194-198.
Peng et al., "Topological Insulator Nanostructures for Near-Infrared Transparent Flexible Electrodes," Nature Chemistry, vol. 4, Apr. 2012, pp. 281-286.
Qi et all, "Topological Insulators and Superconductors," arXiv:1008.2026v1 [cond-mat.mes-hall], (2010), pp. 1-54.
Zhang, "Viewpoint: Topological States of Quantum Matter," American Physical Society, Physics 1, 6 (2008), 3 pages.
Zhu et al., "Optical Transmittal of Multilayer Graphene," EPL, 108 (2014) 17007, 4 pages.
Gu, "Chapter 2—Laser Additive Manufacturing (AM): Classification, Processing Philosophy, and Metallurgical Mechanisms," Laser Additive Manufacturing of High-Performance Materials, 2015, XVII, pp. 15-24.
Wikipedia, Graphene, https://en.wikipedia.org/wiki/Graphene, 29 pages, downloaded Nov. 15, 2017.
Wikipedia, Scanning Tunneling Microscope, https://en.wikipedia.org/wiki/Scanning_Tunneling_Microscope, 9 pages.
Wikipedia, "Nanometre," https://en.wikipedia.org/wiki/Nanometre, 2 pages.
Wikipedia, "Carbon Nanotube," https://en.wikipedia.org/wiki/Carbon_Nanotube, 22 pages.

* cited by examiner

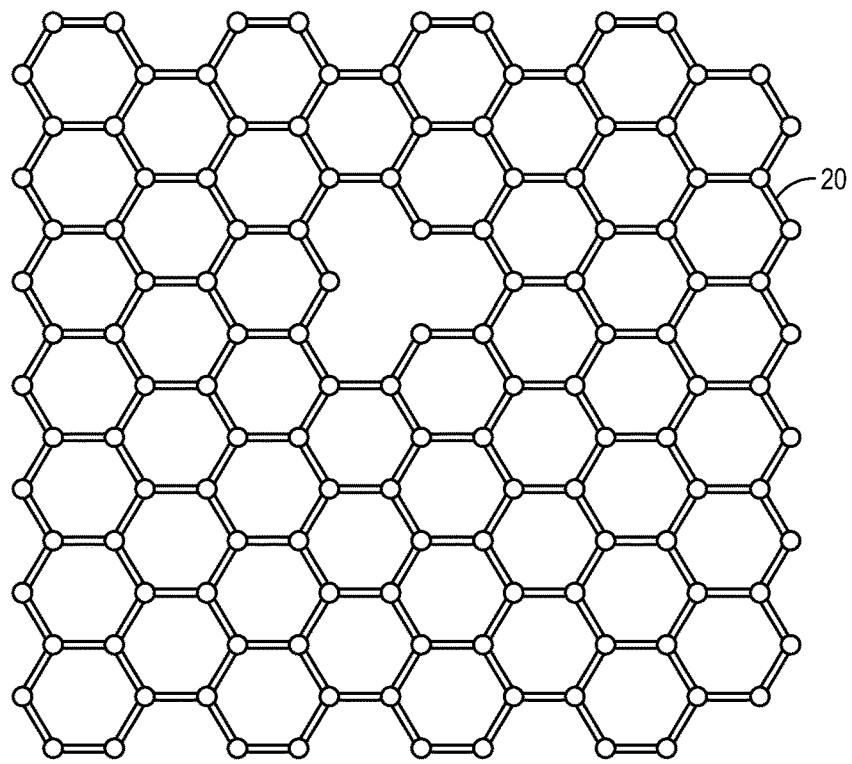
FIG. 8A1
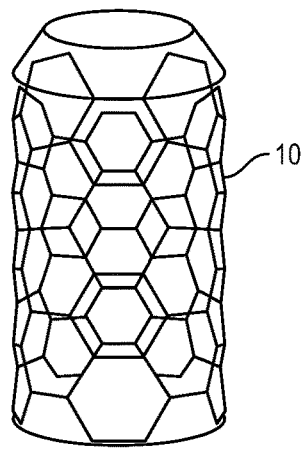
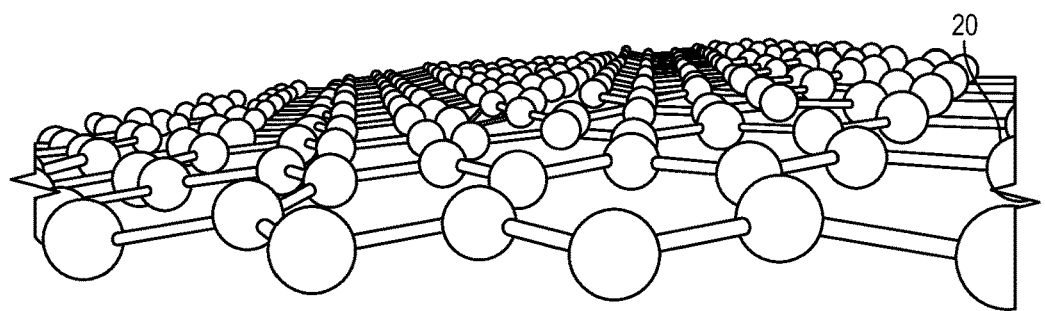
FIG. 8A2

US 10,987,825 B2

TOPOLOGICAL INSULATOR NANOTUBE DEVICE AND METHODS OF EMPLOYING THE NANOTUBE DEVICE

DETAILED DESCRIPTION

Field of the Disclosure

The present disclosure relates to a particle shooter system comprising a non-carbon topological insulator nanotube. The present disclosure also relates to methods for two-dimensional and three-dimensional printing or additive/subtractive manufacturing using the particle shooter system.

Background

Layered two-dimensional (2D) and three-dimensional (3D) arrays of particles are now being used in the production and manufacture of many different items. An example of a device using such layered particle arrays is a 3D printer. The term "3D printer" is a general term which includes devices which perform additive and/or subtractive manufacturing.

Currently, 2D and 3D devices do not print or produce layers atom-by-atom or particle-by-particle. Instead, to place particles (e.g., particles on the order of 0.1 nm to 10 nm in diameter) onto a substrate or an existing layer, current devices and methods simply bombard the surface with particles and then analyze the substrate to determine if any particles have attached to the surface. With current 2D/3D devices and methods, there is no suitable technique for controlling where particles actually go. Nor do current 2D/3D devices and methods control how many particles are placed on the substrate or layer.

Graphene is known as a material suitable for use in layers deposited using 3D printing techniques. Graphene is an allotrope of carbon. Its structure is one-atom thick planar sheets of $sp^2$-bonded carbon atoms that are densely packed in a honeycomb lattice. In many cases, honeycomb lattice imperfections due to manufacturing defects may cause issues in the production and manufacturing of 2D and 3D structures.

There are advantages to removing carbon atoms, thereby leaving "holes" in a graphene sheet. Currently, this can be achieved using several different mechanisms, including mechanical breakage of the carbon-carbon bond using an STM tip, using a photonic crystal, or an ion or proton beam. Current devices, however, do not have the capability of directing the particles to a precise location on the graphene surface. In addition, certain known devices can crash or plunge into the graphene and destroy the surface area of the graphene and/or destroy the device.

Accordingly, there is a need for a device that can be controlled and aimed at a specific location, such as a specific particle in a substrate, layer, 2D, or 3D structure. There is also a need for a device and a method for preparing one or more layers of particles on a particle-by-particle basis.

SUMMARY

The present disclosure is directed to a particle shooter system. The particle shooter system comprises a non-carbon topological insulator nanotube defining a bore extending between first and second ends thereof. A particle shooter is operably coupled with the first end of the non-carbon topological insulator nanotube, and configured to transmit a single particle through the bore of the non-carbon topological insulator nanotube. A positioning mechanism is operably coupled with the non-carbon topological insulator nanotube and configured to aim the non-carbon topological insulator nanotube at a target disposed proximal the second end thereof.

The present disclosure is also directed to a method for aiming a particle shooter. The method comprises: positioning a non-carbon topological insulator nanotube toward a target; shooting a particle from the non-carbon topological insulator nanotube towards the target at a first power; sensing a location hit by the particle after shooting; and re-positioning the non-carbon topological insulator nanotube based on the location.

An implementation of the present disclosure is also directed to a method for additive/subtractive manufacturing. The method comprises: positioning a non-carbon topological insulator nanotube toward a target; and shooting a particle down the non-carbon topological insulator nanotube at the target.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

FIGS. 8A1, 8A2, 8B, 8C and 8D illustrate one or more particles removed from the target as a result of being hit by a particle from the non-carbon topological insulator nanotube particle shooter system of the present disclosure.

Figure 1A:
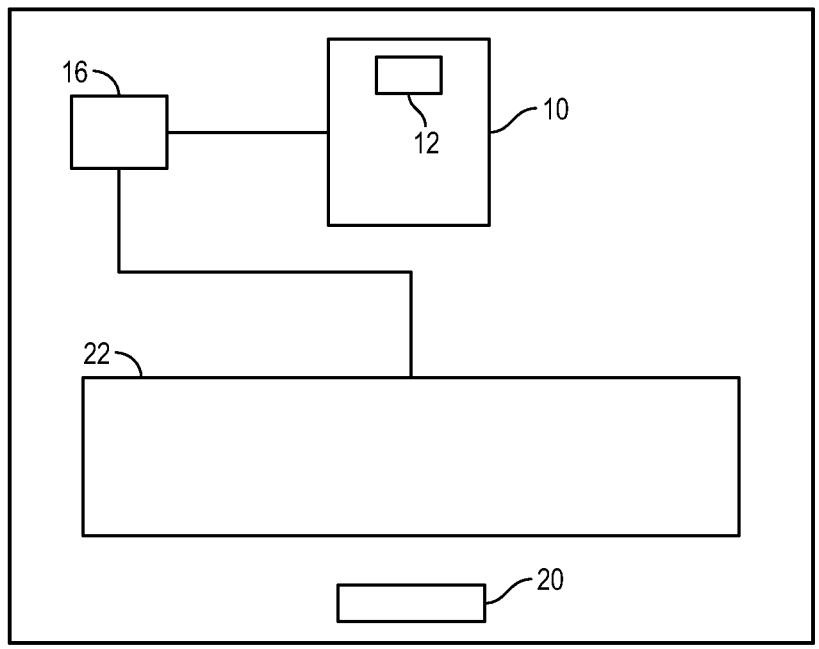
FIG. 1A is a block diagram of a non-carbon topological insulator nanotube particle shooter system, according to the present disclosure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to a particle shooter system. The system comprises a non-carbon topological insulator nanotube defining a bore extending between first and second ends thereof. A particle shooter is operably coupled with the first end of the non-carbon topological insulator nanotube. The particle shooter is configured to transmit a single particle through the bore of the non-carbon topological insulator nanotube. A positioning mechanism is operably coupled with the non-carbon topological insulator nanotube and configured to aim the non-carbon topological insulator nanotube at a target disposed proximal the second end thereof.

Systems of the present disclosure can potentially be used for one or more applications chosen from 2D or 3D printing, an atomic or a molecular additive and/or subtractive manufacturing process, a doping process, such as for example doping used during transistor or semiconductor fabrication, causing interstitial defects in material to fabricate filters, such as atomic sieves, and/or in biological applications such as, for example, building enzymes, protein synthesis, or DNA synthesis.

FIG. 1A shows a block diagram of a particle shooter system of the present disclosure. The particle shooter system comprises a non-carbon topological insulator nanotube 10 defining a bore extending between first and second ends thereof. A particle shooter 12 is operably coupled with the first end of the non-carbon topological insulator nanotube, and configured to transmit a single particle through the bore of the non-carbon topological insulator nanotube. The particle shooter can comprise one or more of a low power laser, high power laser, particle accelerator, or any other suitable particle source. The terms "low power" and "high power" as they refer to lasers are described herein below. A positioning mechanism 16 is operably coupled with the non-carbon topological insulator nanotube and configured to aim the non-carbon topological insulator nanotube at a target 20 disposed proximal the second end thereof. The system can also include a detection sensor 22 that can, for example, detect information regarding the location of the target 20 that was hit by the particle, as will be discussed in more detail below.

Figure 1B:
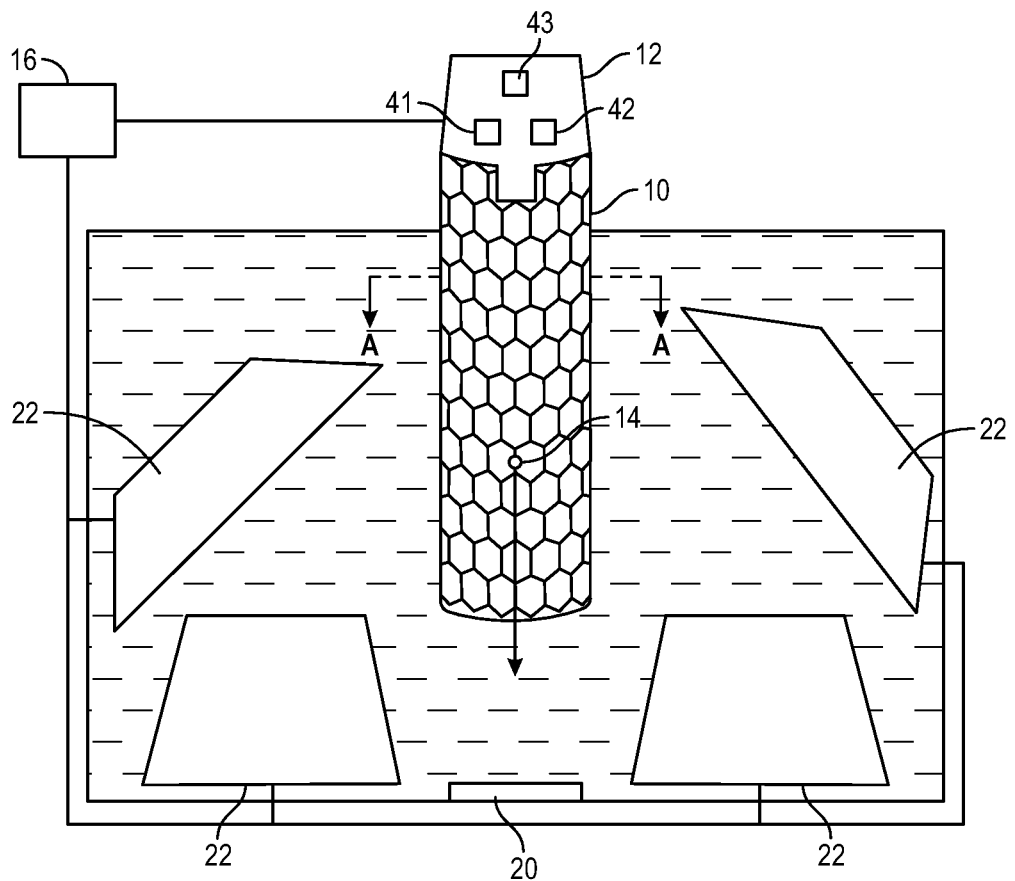
FIG. 1B illustrates a perspective view of a non-carbon topological insulator nanotube particle shooter system, according to the present disclosure.

FIG. 1B illustrates an example of a particle shooter system of the present disclosure. The system of FIG. 1B includes a non-carbon topological insulator nanotube 10. The non-carbon topological insulator nanotube 10 can comprise any suitable non-carbon based topological insulator material. For example, the non-carbon topological insulator nanotube can comprise at least one element of antimony (Sb), bismuth (Bi), selenium (Se) or tellurium (Te), or combinations thereof. The at least one non-carbon-based topological insulator can comprise, consist essentially of, or consist of, but are not limited to, at least one compound of $Bi_{1-x}Sb_x(0<x<1)$ (e.g., $Bi_{0.9}Sb_{0.1}$), $Bi_{1-x}Te_x(0<x<1)$, $Bi_{1-x}Te_x(0<x<1)$, Sb, $Bi_2Se_3$, $Bi_2Te_3$, $Sb_2Te_3$, $Bi_2Te_2Se$, $(Bi, Sb)_2Te_3$ (e.g., $(Bi_{0.2}Sb_{0.5})_2Te_3$), $Bi_{1-x}Sb_xTe_{3-y}Se_y(0\leq x\leq 2; 0\leq y\leq 3)$, $Bi_{1-x}Sb_xTe_{3-y}Se_y(0\leq x\leq 2; 1\leq y\leq 3)$ (e.g., $Bi_2Te_{1.95}Se_{1.05}$, $BiSbTe_{1.25}Se_{1.75}$), $Bi_2Te_{1.6}S_{1.4}$, $Bi_{1.1}Sb_{0.9}Te_2S$, $Sb_2Te_2Se$, $Bi_2(Te,Se)_2(Se,S)$, $TlBiSe_2$, $TlB-iTe_2$, $TlBi(S_{1-x}Se_x)_2(0.5\leq x\leq 1)$, $Pb(Bi_{1-x}Sb_x)_2Te_4(0\leq x\leq 1)$, $PbBi_2Te_4$, $PbSb_2Te_4$, $PbBi_4Te_7$, $GeBi_2Te_4$, $GeBi_{4-x}Sb_xTe_7$ $(0\leq x\leq 4)$, $(PbSe)_5(Bi_2Se_3)_3$, $(PbSe)_5(Bi_2Se_3)_6$, $(Bi_2)(Bi_2Se_{2.6}S_{0.4})$, $Bi_4Se_3$, $Bi_4Se_{2.6}S_{0.4}$, $(Bi_2)(Bi_2Te_3)_2$, SnTe, $Pb_{1-x}Sn_xSe$ $(0<x<1)$, $Pb_{1-x}Sn_xTe(0<x<1)$, $Pb_{0.77}Sn_{0.23}Se$, $Bi_{1.84-x}Fe_{0.16}Ca_xSe_3(0\leq x<1.84)$, $Cr_{0.05}(Bi_{0.1}Sb_{0.9})_{1.92}Te_3$, $(Dy_xBi_{1-x})_2Te_3(0<x<1)$, $Ni_xBi_{2-x}Se_3(0<x<2)$, $(Ho_xBi_{1-x})_2Se_3(0\leq x<1)$, $Ag_2Te$, $SmB_6$, $Bi_{14}Rh_3I_9$, $Bi_{1-x}Ca_xSe_3(0<x<2)$, $Bi_{2-x}Mn_xTe_3(0<x<2)$ (e.g., $Bi_{1.91}Mn_{0.09}Te_3$, $Bi_{1.96}Mn_{0.04}Te_3$, $Bi_{1.98}Mn_{0.02}Te_3$), $Ba_2BiBrO_6$, $Ba_2BiIO_6$, $Ca_2BiBrO_6$, $Ca_2BiIO_6$, $Sr_2BiBrO_6$, or $Sr_2BiIO_6$, or combinations thereof.

The non-carbon topological insulator nanotube can be of various diameters and have one or more walls. In an example, a particle shooter 12 is coupled to one end of non-carbon topological insulator nanotube 10. Particle shooter 12 can be coupled mechanically and/or optically to non-carbon topological insulator nanotube 10, The coupling of the particle shooter to the non-carbon topological insulator nanotube can, for example, be accomplished by a number of standard optical elements which typically involve focusing the emission of the particle shooter to a small enough diameter so that the particles will be emitted into the non-carbon topological insulator nanotube. Alternatively, the particle shooter is located in a position separate from, such as above, the non-carbon topological insulator nanotube. In a further example, the particle shooter is aimed into a MEMS (MicroElectroMechanicalSystems) device, such as, for example, a reflective mirror that has X-Y directionality controls. The particle shooter emits particles to the MEMS, which employs the X-Y controlling mechanism to aim/angle the particles directly into the non-carbon topological insulator nanotube 10. Obtaining and integrating suitable MEMS devices into the particle shooter system of the present disclosure would be within the ordinary skill of the art.

Figures 2, 3A:
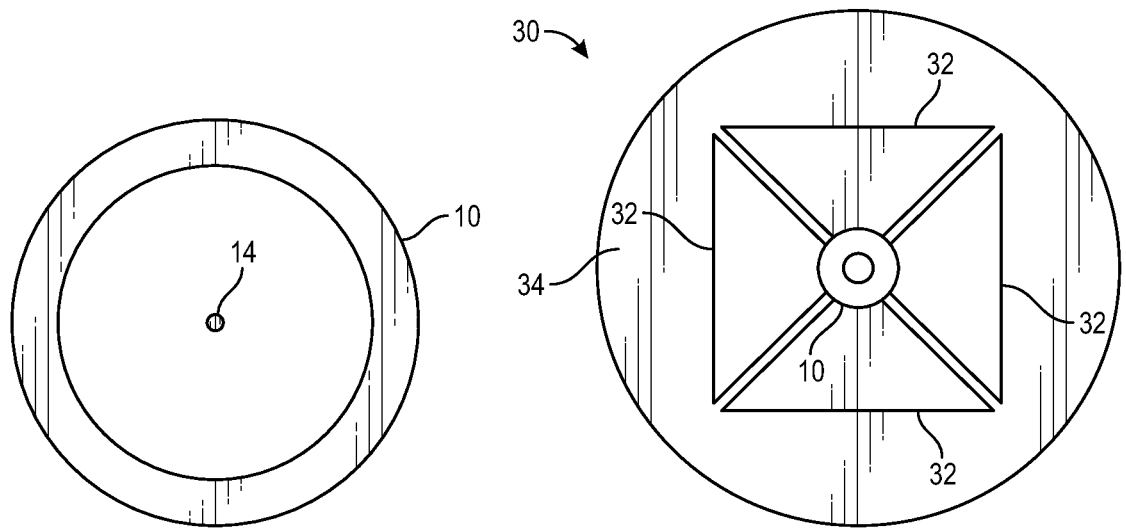
FIG. 2 illustrates a sectional view through A-A' of the non-carbon topological insulator nanotube of FIG. 1B.
FIGS. 3A and 3B illustrate a piezoelectric positioning mechanism, according to the present disclosure.

The particle shooter 12 can be any suitable device that can shoot, send, accelerate or transmit a particle 14 through the bore of the non-carbon topological insulator nanotube 10, as shown in FIG. 1B and FIG. 2. Alternatively, more than one particle or a stream of particles can be shot through the bore of the non-carbon topological insulator nanotube 10. Suitable examples of particle shooters include one or more lasers (e.g., low power laser 41, high power laser 42) and particle accelerators 43. The terms "low power laser" and "high power laser" are described in more detail below. To ensure that the particle travels through the non-carbon topological insulator nanotube, the energy and momentum of the particle can be adjusted so that the particle does not have enough energy to break through a wall of the non-carbon topological insulator nanotube 10. Systems and techniques for adjusting the energy and/or momentum of the particle using electric fields, for example, are well known in the art. The particle 14 travels through the bore and exits from an end of the non-carbon topological insulator nanotube that is distal from the particle shooter 12. The particle shooter 12 and the non-carbon topological insulator nanotube 10 can be configured so that the particle 14 travels through the bore and exits the non-carbon topological insulator nanotube 10 in a desired trajectory. In an example, if the particle 14 is a photon, the index of refraction of the non-carbon topological insulator nanotube 10 is chosen to have a value so that the photon exits from the tube at a desired angle, such as an angle not larger than 20 degrees with respect to a longitudinal axis of the non-carbon topological insulator nanotube 10. If the particle is a finite mass entity, then the nanotube can be physically constructed and arranged with respect to the particle shooter 12 so that the particle exit angle is constrained to be within a desired angle, such as an angle that is not larger than 20 degrees with respect to a longitudinal axis of the non-carbon topological insulator nanotube 10. The reason the angle is chosen to be not larger than 20 degrees is that it becomes difficult to determine where the particle is going for angles that are larger than 20 degrees.

In a further example, the particle shooter includes a low power laser 41. The laser "shoots" or emits particles in the form of photons. The number of particles, or photons, emitted per second is dependent on the laser power, and can be modified by standard intensity controls, such as, for example, crossed polarizers with a waveplate inserted, which would allow laser intensity to vary from 100% to 0%. Examples of possible lasers to be used with the non-carbon topological insulator nanotube include a pulsed laser, a continuous laser, a semiconductor laser, and a light emitting device (LED) laser, an adjustable power laser or an adjustable wavelength laser. In a further example, the laser can be one that can be turned on/off or the power adjusted. In a further example, the frequency and/or the intensity of the laser can be varied. In a still further example, the format of the laser, such as, continuous or pulsed, can be varied.

Examples of particles which can be shot, sent, accelerated or transmitted down the non-carbon topological insulator nanotube include a photon, an electron, a proton, an atom, an ion, and a molecule. Alternatively, small groups of atoms or nanoparticles, such as, for example, a 3×3 atomic cube, are shot through the bore of the non-carbon topological insulator nanotube 10. It is noted that for some quantities of such particles, such as a single particle or a discrete or small stream of particles, it may be easier to detect the resulting vibrations and time delays when the particle or stream collides with the target, than for a non-discrete quantity of particles. For example, when a single particle or a discrete or small stream of particles collides with the target, small disturbances (e.g., vibrations) can be detected with an optical system (e.g., a laser beam) that is monitoring the surface of the target.

Figure 3B:
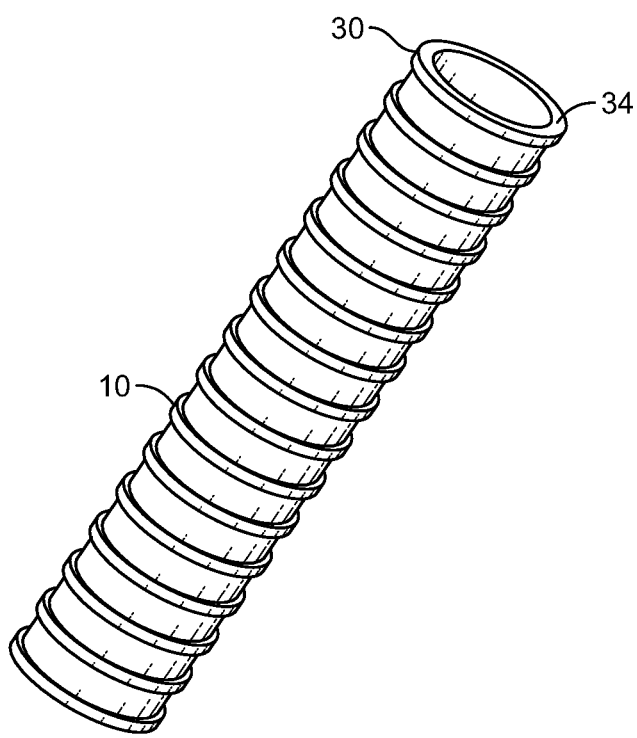

A positioning mechanism 16 can be coupled to non-carbon topological insulator nanotube 10. Examples of possible positioning mechanisms include a mechanical coupling, an electrostatic coupling, and/or an electromagnetic coupling. In a further example, the positioning mechanism can be a mechanical arm. The positioning mechanism can be coupled to any point on non-carbon topological insulator nanotube 10. In another example, the positioning mechanism 16 can be a piezoelectric, such as for example lead zirconate titanate (PZT), that provides for accurate movement of the non-carbon topological insulator nanotube 10. Piezoelectrics are solid state crystal structures that deform when an external field is applied. The deformation allows a linear displacement. Three of the solid state crystal piezoelectric structures in an XYZ configuration can provide for accurate positioning of the non-carbon topological insulator nanotube. An example of a piezoelectric is shown in FIG. 3. In FIG. 3A, a piezoelectric 30 has, e.g., 4 piezo crystals 32 affixed to a flexible membrane 34. The piezo crystals 32 provide fine control to the motion of the non-carbon topological insulator nanotube 10, two of the crystals controlling the X motion and two controlling the Y motion in the plane of FIG. 3A. The piezoelectric 30 can be located at, for example, the top of non-carbon topological insulator nanotube 10 as shown in FIG. 3B. The piezo crystals can be used to precisely move and aim the non-carbon topological insulator nanotube.

Referring to FIG. 1B, positioning mechanism 16 moves non-carbon topological insulator nanotube 10 to desired locations based on information gathered during the initial shooting of particle 14 through the bore of non-carbon topological insulator nanotube 10. The information can be gathered using, for example, the detection sensors 22, as described in more detail herein. The positioning mechanism 16 can move the non-carbon topological insulator nanotube in the X-Y or X-Y-Z directions. In an implementation shown in FIG. 4, an X-Y-Z controller 18 can be coupled to positioning mechanism 16 to control the movement in the X-Y-Z direction. In an alternative example, the target 20 can be moved based on the information gathered during the shooting of the particle 14 through the non-carbon topological insulator nanotube. In a further example, both the non-carbon topological insulator nanotube 10 and/or the target 20 can be moved based on the information gathered during the shooting of the particle 14 through the non-carbon topological insulator nanotube 10.

Located a suitable distance from an end of non-carbon topological insulator nanotube 10 that is distal from the particle shooter 12 is a target 20. The distance from the non-carbon topological insulator nanotube 10 to the target 20 can vary based on, e.g., the size, material, and velocity of both the particles shot from the non-carbon topological insulator nanotube and the particles in the target 20. Possible examples of a target 20 include one of more materials (which may be in, for example, layers, fibers, particulates or other forms) chosen from graphene, a graphene sheet, a nanotube, a fullerene, a semiconductor (e.g., silicon, germanium, and gallium nitride), a topological insulator, including any topological insulators described herein, and a substrate. In another example, the target is one of a biological nature such as, for example, a precursor or molecule of one of an enzyme, a protein, and a DNA. In a further example, each of the above targets is a layer or layers of previously deposited particles.

Figure 4:
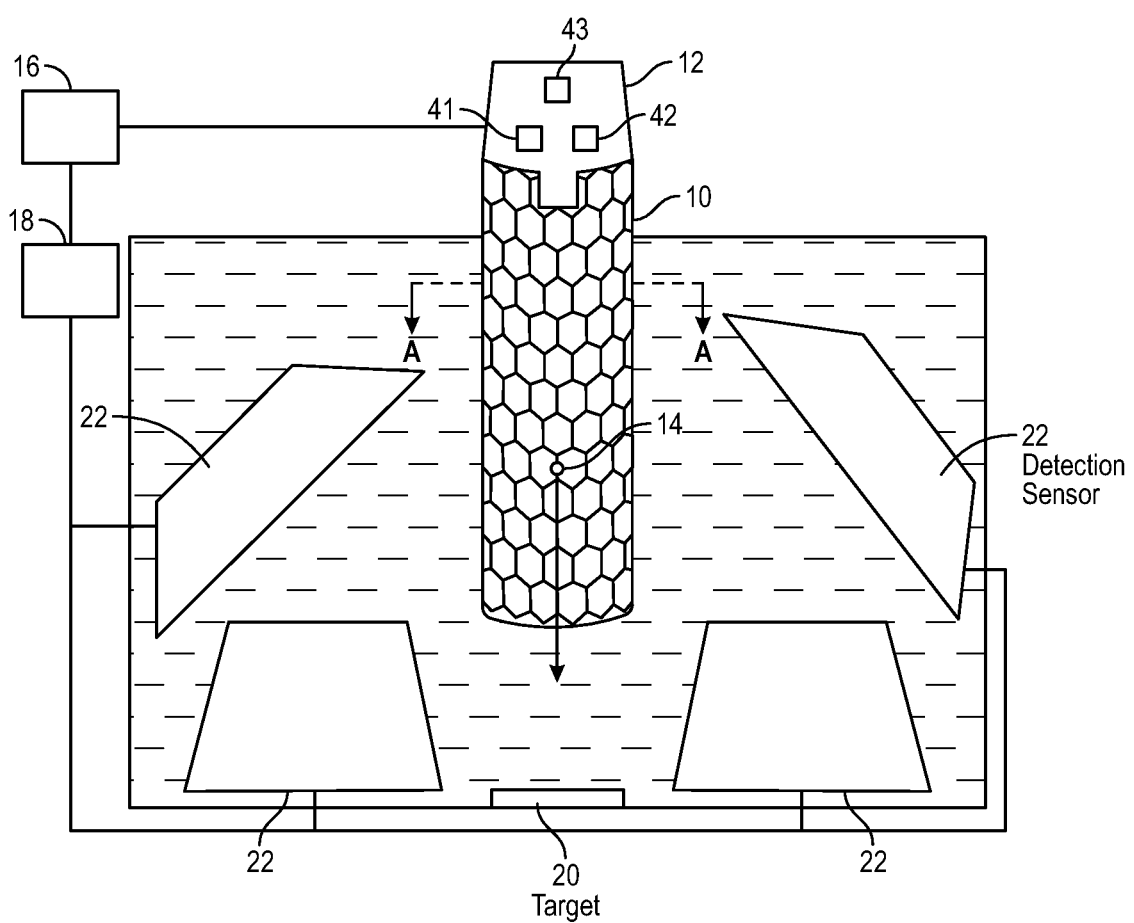
FIG. 4 illustrates a non-carbon topological insulator nanotube particle shooter system, according to the present disclosure.

In a further example, a detection sensor 22 is utilized in the device of the present disclosure. The detection sensor 22 can be located above, below, or both above and below the target 20. FIGS. 1 and 4 show detection sensors 22 at multiple locations. One or more of the detection locations and sensors can be used in the disclosed particle shooter systems. In addition or alternatively, the detection sensor 22 can be located in the same plane as the target 20. The detection sensor 22 can comprise a system of sensors for sensing energy or movement. For instance, the detection sensor 22 can comprise one or more sensors chosen from an optical sensor, mechanical sensor, vibrational sensor, electrical sensor, heat-sensing sensor, electro-magnetic energy sensor and movement sensor. The detection sensor 22 senses a physical phenomenon, for example, physical, optical, heat, electrical or electromagnetic, Doppler, and/or interference oscillations, vibrations or effects, that occur when the particle hits the target. The detection sensor 22 then measures the oscillations, vibrations, and/or effects and provides information to positioning mechanism 16 regarding the location on the target 20 that was hit by the particle 14. In another example, detection sensor 22 provides the information to X-Y-Z controller 18, which then uses that information to instruct positioning mechanism 16 in guiding non-carbon topological insulator nanotube 10 to the correct position. In a further example, a feedback circuit is located between detection sensor 22 and X-Y-Z controller 18 or positioning mechanism 16. One example, of a suitable detection sensor is a laser vibrometer. The detection sensor can optionally include a measurement system. Alternatively, the measurement system is separate from the detection sensor. The system will convert physical, optical, electrical, and/or electromagnetic variations into, for instance, an electrical signal (either analog or digital)) that can be used to control positioning mechanism 16 and/or X-Y-Z controller 18, The positioning mechanism then adjusts the relative location of the non-carbon topological insulator nanotube (via X-, Y-, and Z-axes) based on this information.

As mentioned above, one or more detection sensors 22 can be placed at various strategic locations to detect and measure the intensity, frequency, and differences in time delays of the physical, optical, electromagnetic, and photonic vibration/oscillation/effect. In another implementation, light/photonic and electromagnetic sensors are located above and below the target 20, while physical and electrical vibration sensors are physically coupled directly on the target 20.

Figure 5:
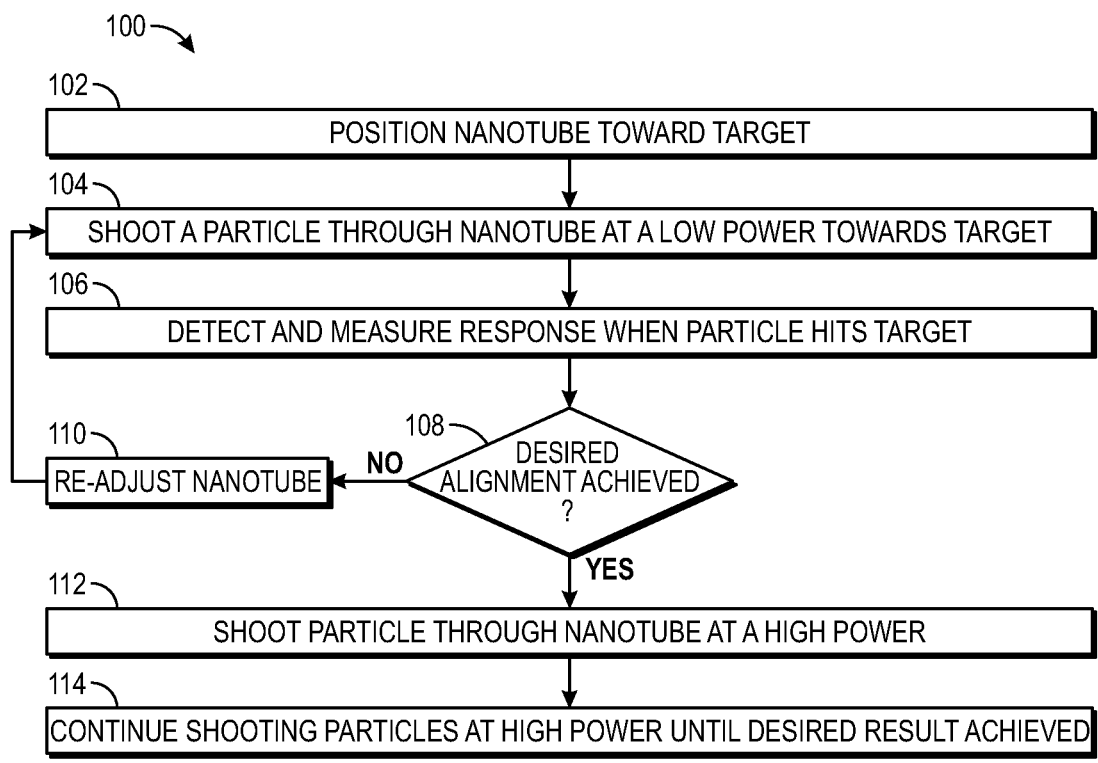
FIG. 5 illustrates a method of operating a particle shooter system, according to the present disclosure.
Figure 6A:
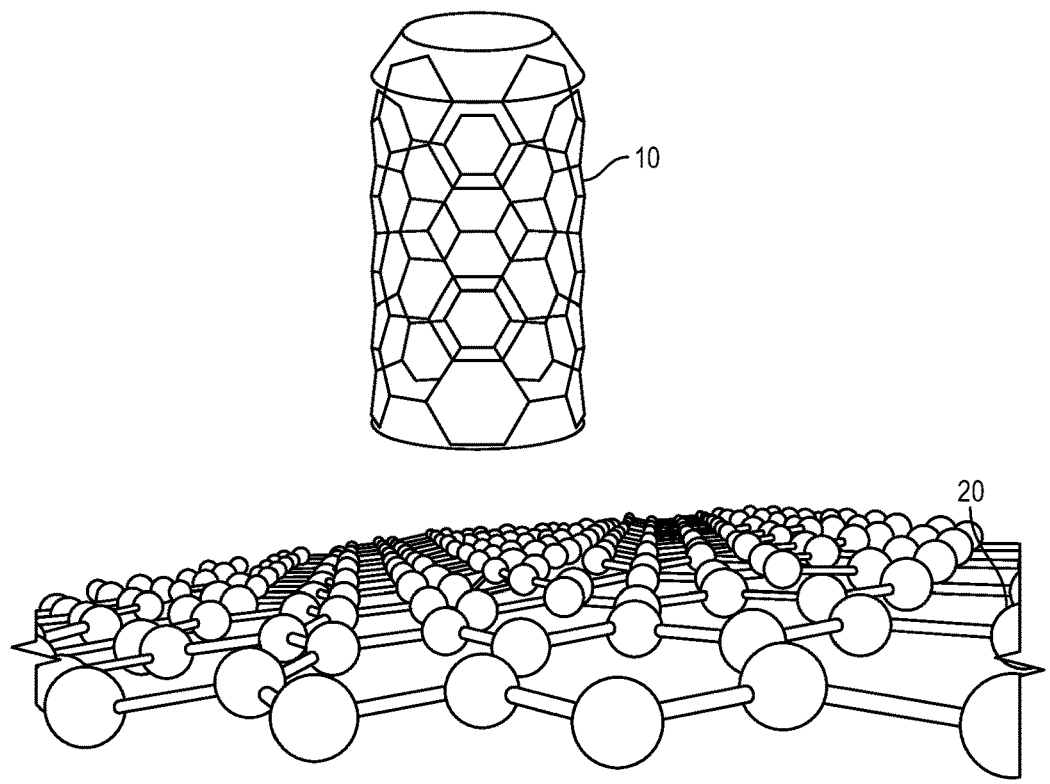
FIGS. 6A-6C illustrates a perspective view of a particle shooter system emitting a particle at a target, according to the present disclosure.
Figure 6B:
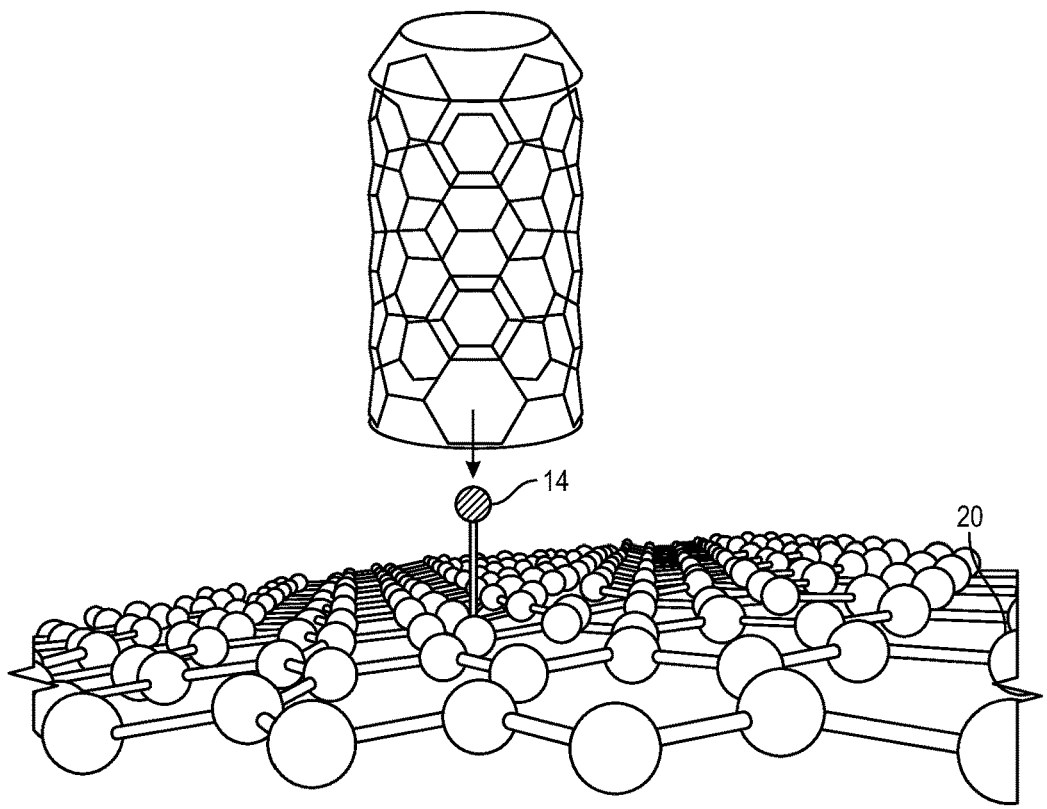
Figure 6C:
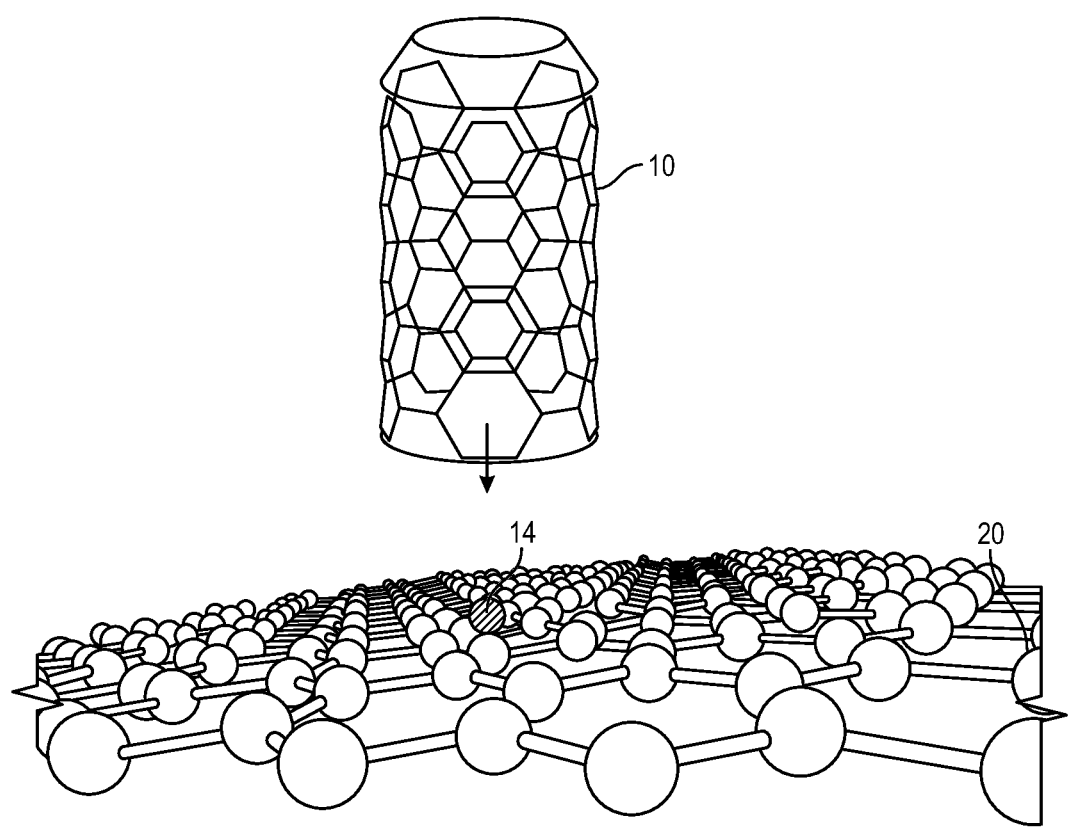
Figure 7:
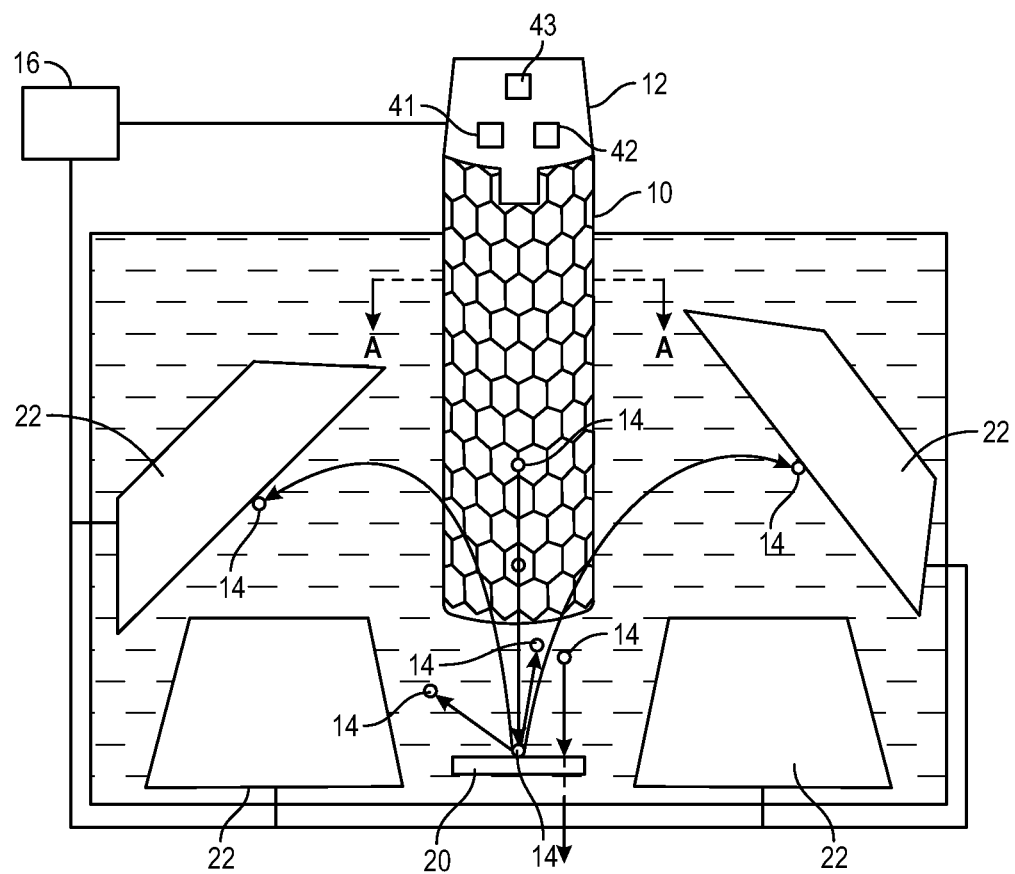
FIG. 7 illustrates examples of how a particle can react after colliding with a target, according to the present disclosure.

FIG. 5 illustrates a method of aiming and shooting particles using the particle shooter systems of the present disclosure. In step 102, non-carbon topological insulator nanotube 10 is positioned towards target 20, as illustrated by FIG. 6A. Non-carbon topological insulator nanotube 10 can be positioned to aim at a portion of the target 20 chosen from, for example, a single atom of target 20, a bond between particles of target 20, space between particles of target 20 and a molecule of target 20. Thereafter, in step 104, a particle 14 is shot from particle shooter 12 through non-carbon topological insulator nanotube 10 so as to exit from an end of the non-carbon topological insulator nanotube towards target 20, as illustrated in FIG. 6B. In one example, particle shooter 12 is set at a low power, such as, a power which is low enough to not create a hole in the target. Such a level will vary depending on the strength of the bonds in the target. An example of such a low power is approximately 10 eV. A particle 14 (e.g., a single particle or particle stream) is then shot at this low power, as illustrated in FIG. 6C, in an attempt to discover a location where the particle hits on the target. In step 106, detection sensor 22 detects the hit. FIG. 7 illustrates examples of how a particle 14 can react after colliding with the target 20 and how detection sensor 22 can be positioned to detect the collision. Then, in step 108, a determination is made whether the desired alignment is achieved based on the detected information.

For example, when the particle (or stream of particles) hits an atom or other particle (e.g., a molecule) in the target, the shot particle reflects off the target particle at various angles depending on where the shot particle hit. Detection sensor 22 can then be used to detect and measure the location of the hit particle. For example, physical, electrical/electromagnetic, and possibly optical oscillations/vibrations/effects occur to the hit particle that the shot particle hits, based on how hard the particle is hit, and the angle which the hit occurs. In a further example, the optical oscillations/vibrations/effects are in the infrared (IR) frequency range of the electromagnetic spectrum. The oscillations/vibrations/effects spread out into and through the material and potentially (optical and electromagnetic) into the surrounding three dimensional space. Measurements can then be made using well known optical techniques based on the amplitude, intensity, frequency, phase, and time delay differences of the oscillations/vibrations/effects. Measurements can also be made based on how long the hit particle vibrates/oscillates. Detection sensor 22 can also be configured to optically detect the collision between the shot particle and the hit particle. Using this information, it can be computed which atom or other particle in the target was hit and where it was hit. If the hit particle was hit tangentially, the tangential collision is detected, and the position adjusted for a more direct hit. A direct hit indicates that the non-carbon topological insulator nanotube is properly aligned. Sensors suitable for use as detection sensors 22 are well known in the art and one of ordinary skill in the art would be able to select and employ such sensors based on the description provided herein.

If a direct hit does not occur, particle 14 may travel through a space between particles in the target, such as the spaces shown as hexagons in FIGS. 6A to 6C. If this occurs, there would be minimal reflection and vibration, which can be observed and/or measured via detection sensor 22. In one example, if detection sensors, such as, e.g., photonic and electromagnetic sensors, are located below the target, the sensors would detect particles or waves that came through without any collisions. This information would indicate that the shot particle missed the desired particle on the target and the noncarbon topological insulator nanotube position needs to be adjusted.

Alternatively, particle 14 travels through a bond between particles in the target without hitting a particle. If this occurs, the collision between the particle and the bond will create a detectable, interaction. For example, when the shot particle strikes or travels through a bond, it will cause the two atoms on each side of the bond to oscillate/vibrate at a detectable amplitude, frequency, and time delay. The detected amplitudes, frequencies, and time delays differ for each atom depending upon how dose to each atom the shot particle was when it passed through and temporarily interfered with the bond.

For example, when the particle temporarily passes through the bond at the midpoint between the two atoms, a temporarily breaks the bond and causes both atoms to vibrate equally and at the same frequencies, since they cause the same "interruption" or interference to each atom. The differences in time delays to the various sensors allows a determination of which atoms and atomic bonds were affected. In another example, when the particle temporarily passes through the bond at the ⅓ point closest to atom A, and the ⅔ point from atom B, then atom A, which is closest to the particle-bond break, will vibrate/oscillate more strongly and/or at a higher amplitude and at a slightly different frequency than atom B. Information from the collisions with the bond between atoms indicates that the particle missed the desired portion of the particle and that the non-carbon topological insulator nanotube's position needs to be adjusted.

if the desired alignment is not achieved, then in step 110, the X- Y-, and/or Z-position of the non-carbon topological insulator nanotube is adjusted based on the detected information. Steps 104-108 are then repeated. If the desired alignment is still not achieved, then steps 110 and 104-108 are repeated until the desired alignment is achieved.

After the desired alignment is achieved, a second particle or stream of particles is optionally shot down the non-carbon topological insulator nanotube at a higher power (step 112) so as to remove or displace an atom or other particle from the target, or to deposit the shot particle on the "aimed-at" particle in the target. This second, higher power particle or stream can be shot by the same particle shooter 12 as used for step 104, or by another particle shooter. For example, FIG. 1B shows a low power laser 41 for shooting a low power particle and a second, high power laser 42 for shooting a high power particle, as shown in HG. 18. The second particle can be the same type as the first particle or a different type of particle. In one example, the second particle is a heavier particle. This second particle, shot at higher power, then directly strikes a particle in the target. Several results are possible with the shot second particle or stream.

Figure 8B:
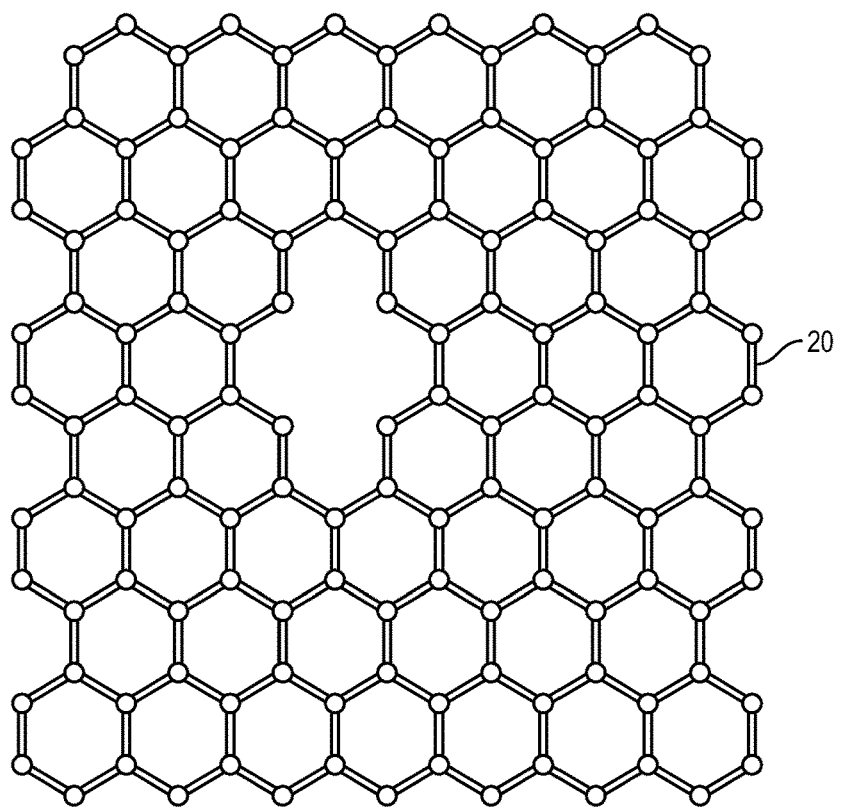
Figure 8C:
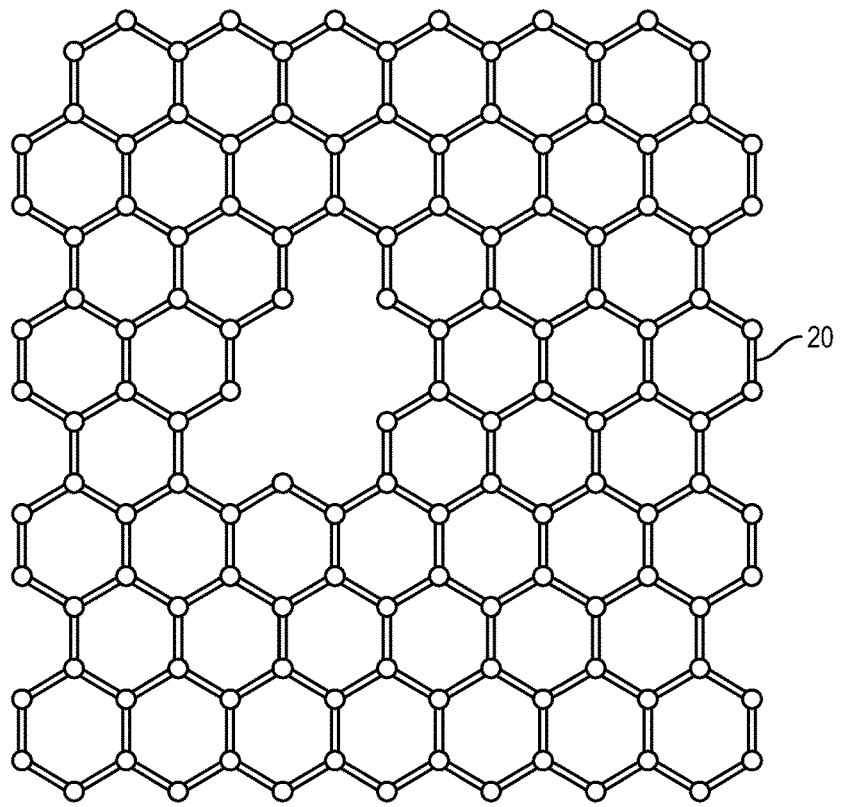
Figure 8D:
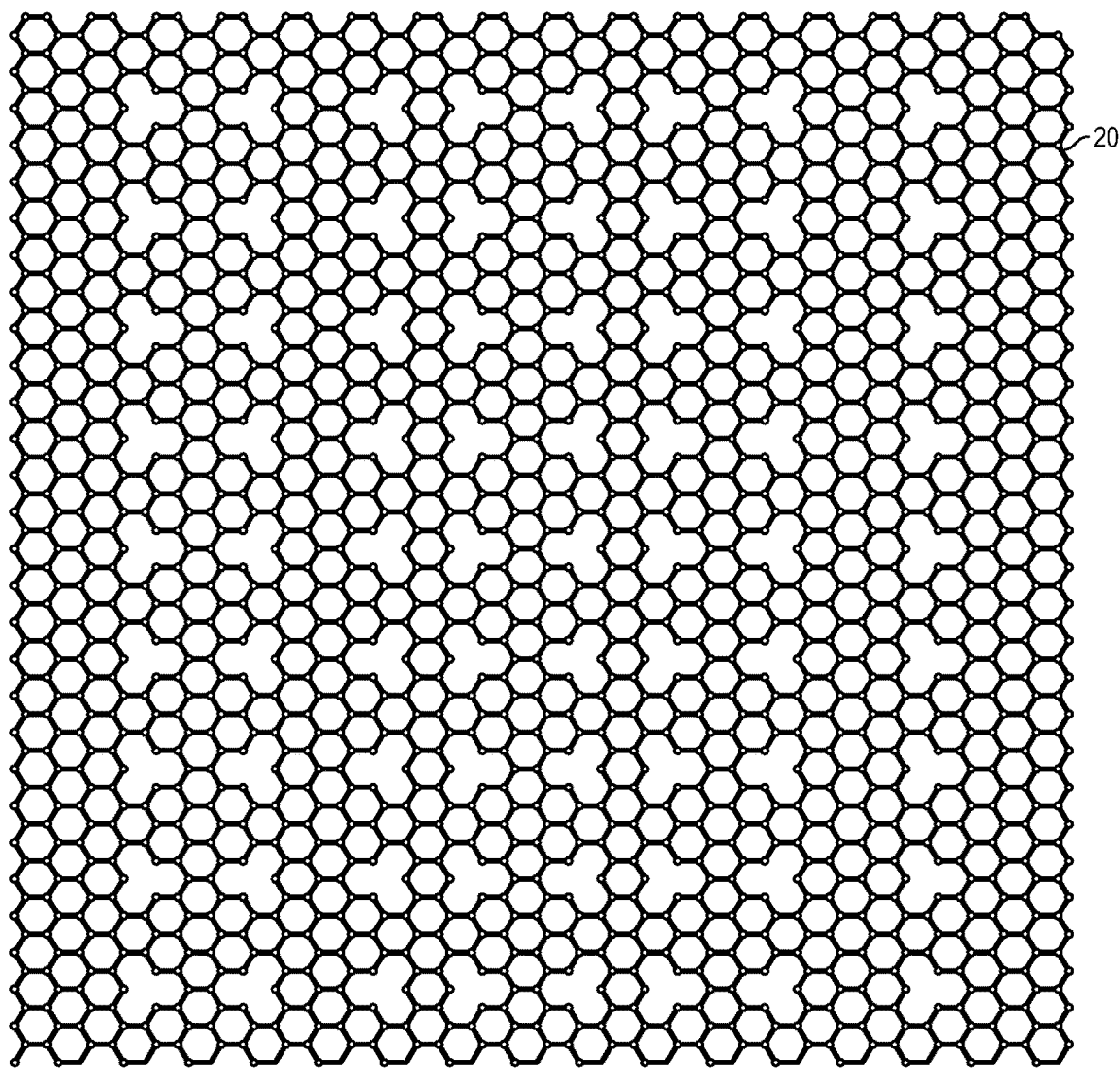

For example, the second particle can remove or "knock-out" an existing particle in the target. An example of this is shown in FIG. 8A1, where an existing particle has been knocked out of a graphene target. FIG. 8A2 shows a perspective view of this. FIG. 8B shows an example where two adjacent existing particles have been knocked out of a graphene target. In such a case, the non-carbon topological insulator nanotube 10 is aligned with a particle in the graphene sheet as described above. Once aligned, a second particle/stream is shot at the target, and the desired existing particle in the target is knocked out. The non-carbon topological insulator nanotube is then aligned with a second adjacent existing particle in the graphene sheet. The same method can be used to remove or knock-out three adjacent existing particles in the target as shown, for example, in FIG. 8C, This method can also be used to create a pattern of knocked-out particles for an entire sheet as shown, for example, in FIG. 8D.

Figure 9:
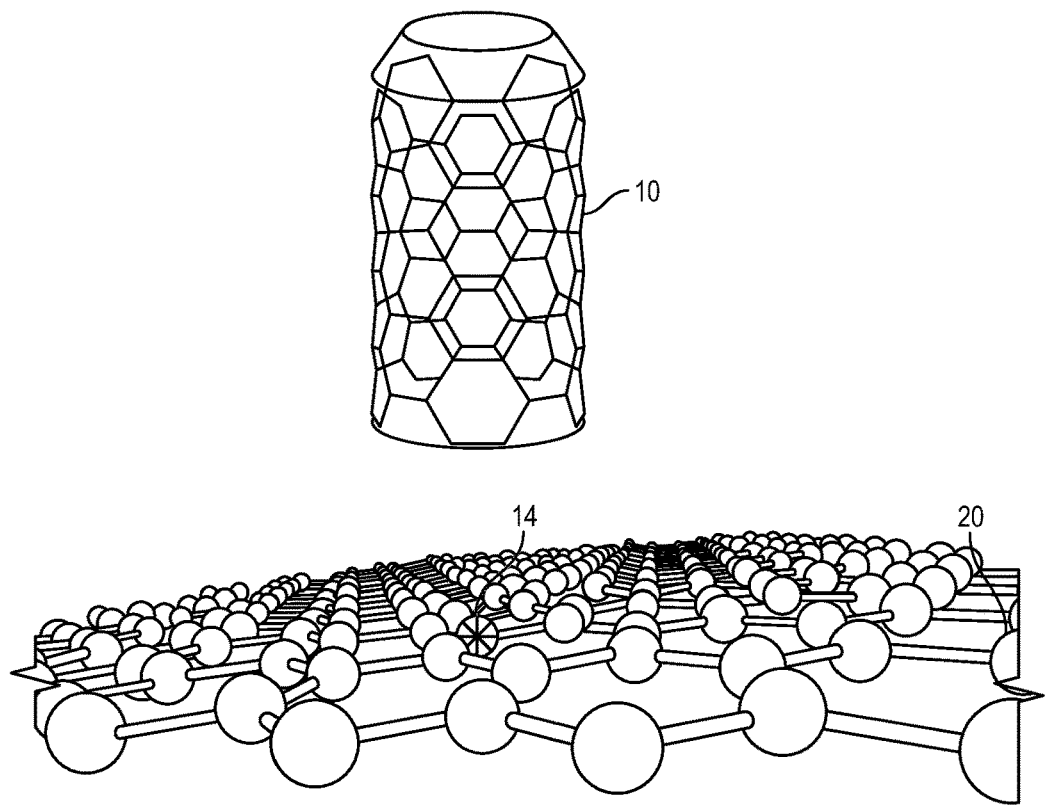
FIG. 9 illustrates a particle shot from the non-carbon topological insulator nanotube particle shooter system replacing a particle in the target.

Alternately, the particle, shot from the non-carbon topological insulator nanotube 10 both "knocks out" and replaces an existing particle in the target. This is shown, for example, in FIG. 9. In a further example, the shot particle removes the existing particle leaving a hole as discussed above, then another shot particle builds on, or positions itself in, the pre-existing hole (e.g., a vacancy). If the hole is pre-existing, the particle can be shot at any suitable power, including a third power that is lower than the second power so that the particle travels with a suitably low energy to be trapped by the bonds in the vacancy, thereby doping the target. In these examples, the target can be any target material described herein and the shot particle can be any particle described herein. In an example, the shot particle is a dopant, such as a platinum ion or atom, boron atom or ion, phosphorous atom or ion, or any other suitable dopant. The ions or atoms can be shot, for example, using particle accelerator 43.

Figure 10:
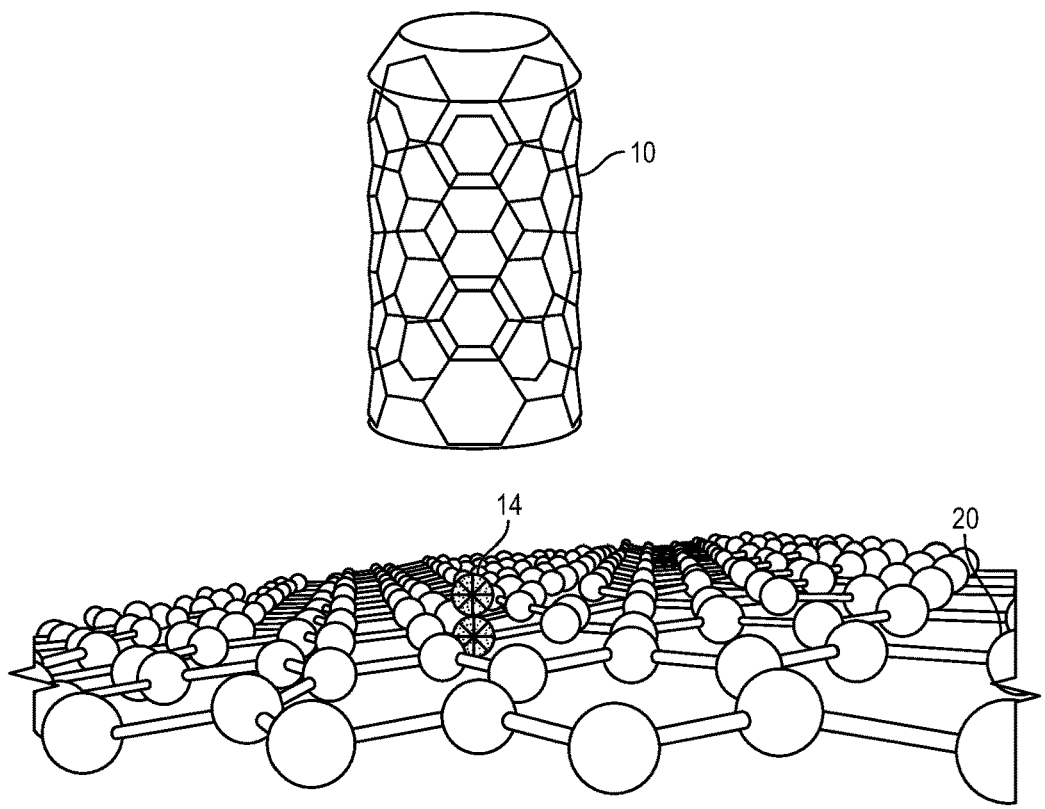
FIG. 10 illustrates a particle shot from the non-carbon topological insulator nanotube particle shooter system that builds on a particle in the target.

In another alternative, the second particle, builds on an existing particle in the target without knocking out or removing the existing particle from the target. This is shown, for example, in FIG. 10. In step 114, this process can be continued until the desired structure is achieved, such as, for example, a new layer is formed. For example, the process can include shooting a plurality of particles at a power that is higher than the low power used for aligning the non-carbon topological insulator nanotube, the plurality of particles hitting one or more particles in the target and being deposited on the target until one or more layers are formed on the target. To build, for example, a 3D material, this process can be repeated to build multiple layers into the desired 3D shape, Optionally, the 3D shape can be heated to sinter, melt or otherwise anneal the 3D structure to form a final product. The present disclosure is also directed to the 2D and 3D products made by the processes described herein with respect to FIG. 5, where the products are built as a single layer (2D structure) or stacked layer by layer to forma 3D structure, followed by an optional heating process.

If it is desired to remove the particle from the target, then the shot particle is shot at a higher power than if it is desired to build on the particle in the target. The power used to build a shot particle on a target particle is generally higher than the low power used initially to aim the particle device.

In a further example, depending upon the particular application, it may be desirable to break the molecular or atomic bonds in the underlying material. In another case, it may be desirable, to interpose an atom within the existing structure. In another application, it may be desirable to create a hole in the substrate. The particle shooter system of the present disclosure can be used for each application, the difference being in the energy associated with the shot atom as it is accelerating towards the target's surface. A relatively small kinetic energy imparted to the particle (e.g., below 3 or 4 eV, although the value be higher depending on the particular target materials used) will result in the particle only breaking or reconfiguring some of the atomic bonds at the surface, with the particle itself bouncing off the surface. A slightly higher kinetic energy (e.g., above 3 or 4 eV, although the value may be lower depending on the target materials used) will allow the particle to be interstitially interjected into the target's surface, while largely maintaining the configuration of the surrounding atomic bonds. Still higher kinetic energy can allow the particle to blast completely through the substrate or target's surface, with sufficient energy to knock out surrounding atoms, causing the surrounding atoms and molecules to reconfigure their bondings about the hole that is created. Thus, the term "high power laser" refers to a laser with a higher power than the low power laser and that has sufficient energy to provide a particle with sufficient energy to accomplish the desired task (e.g., remove or knock-out an existing particle in the target, replace a particle, build on the target, or break molecular or atomic bonds, as described above. Example power ranges for high power lasers include 1 megawatt or higher, such as 1 megawatt to 100 megawatts. Example power ranges for low power lasers include powers less than 1 megawatt, such as 0.001 megawatts to 0.99 megawatts. These power values are associated with pulsed lasers, so that only millijoules of energy can create high power if they are in nanosecond or picosecond duration pulses.

This description has been offered for illustrative purposes only and is not intended to limit the invention of this application.

All mentioned documents are incorporated by reference as if herein written. When introducing elements of the present invention, the articles "the" and "said" are intended to mean that there are one or more of the elements. The terms "comprising," "including" and "having" are intended to be inclusive and mean that there may be additional elements other than the listed elements. Although this invention has been described with respect to specific examples, the details of these examples are not to be construed as limitations.

What is claimed as new and desired to be protected by Letters Patent is set forth in the appended claims.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims. What is claimed is:

What is claimed is:
1. A particle shooter system, comprising:
a non-carbon topological insulator nanotube defining a bore extending between first and second ends thereof;
a particle shooter operably coupled with the first end of the non-carbon topological insulator nanotube, and configured to transmit a single particle through the bore of the non-carbon topological insulator nanotube; and
a positioning mechanism operably coupled with the non-carbon topological insulator nanotube and configured to aim the non-carbon topological insulator nanotube at a target disposed proximal the second end thereof, wherein the positioning mechanism comprises at least one coupling chosen from an electrostatic coupling, an electromagnetic coupling, and a piezoelectric coupling.

2. The particle shooter system of claim 1, wherein the non-carbon topological insulator nanotube comprises at least one of antimony (Sb), bismuth (Bi), selenium (Se) or tellurium (Te), or combinations thereof.

3. The particle shooter system of claim 1, wherein the non-carbon topological insulator nanotube comprises at least one of $Bi_{1-x}Sb_x$ (0<x<1), $Bi_{1-x}Te_x$ (0<x<1), $Bi_{1-x}Te_x$ (0<x<1), Sb, $Bi_2Se_3$, $Bi_2Te_3$, $Sb_2Te_3$, $Bi_2Te_2Se$, $(Bi,Sb)_2Te_3$, $Bi_{2-x}Sb_xTe_{3-y}Se_y$(0≤x≤2; 0≤y≤3), $Bi_{2-x}Sb_xTe_{3-y}Se_y$ (0≤x≤2; 1≤y≤3), $Bi_2Te_{1.6}S_{1.4}$, $Bi_{1.1}Sb_{0.9}Te_2S$, $Sb_2Te_2Se$, $Bi_2(Te, Se)_2(Se,S)$, $TlBiSe_2$, $TlBiTe_2$, $TlBi(S_{1-x}Se_x)_2$ (0.5≤x≤1), $Pb(Bi_{1-x}Sb_x)_2Te_4$ (0≤x≤1), $PbBi_2Te_4$, $PbSb_2Te_4$, $PbBi_4Te_7$, $GeBi_2Te_4$, $GeBi_{4-x}Sb_xTe_7$ (0≤x≤4), $(PbSe)_5(Bi_2Se_3)_3$, $(PbSe)_5(Bi_2Se_3)_6$, $(Bi_2)(Bi_2Se_{2.6}S_{0.4})$, $Bi_4Se_3$, $Bi_4Se_{2.6}S_{0.4}$, $(Bi_2)(Bi_2Te_3)_2$, SnTe, $Pb_{1-x}Sn_xSe$ (0<x<1), $Pb_{1-x}Sn_xTe$ (0<x<1), $Pb_{0.77}Sn_{0.23}Se$, $Bi_{1.84-x}Fe_{0.16}Ca_xSe_3$ (0≤x≤1.84), $Cr_{0.08}(Bi_{0.1}Sb_{0.9})_{1.92}Te_3$, $(Dy_xBi_{1-x})_2Te_3$ (0<x<1), $Ni_xBi_{2-x}Se_3$ (0<x<2), $(Ho_xBi_{1-x})_2Se_3$ (0≤x<1), $Ag_2Te$, $SmB_6$, $Bi_{14}Rh_3I_9$, $Bi_{2-x}Ca_xSe_3$ (0<x<2), $Bi_{2-x}Mn_xTe_3$ (0<x<2), $Ba_2BiBrO_6$, $Ba_2BiIO_6$, $Ca_2BiBrO_6$, $Ca_2BiIO_6$, $Sr_2BiBrO_6$ or $Sr_2BiIO_6$, or combinations thereof.

4. The particle shooter system of claim 1, wherein the particle is a photon, an electron, a proton, an atom, an ion, or a molecule.

5. The particle shooter system of claim 1, wherein the particle shooter includes at least one device chosen from a laser and a particle accelerator.

6. The particle shooter system of claim 5, wherein the particle shooter comprises a laser, the laser being a pulsed laser, a continuous laser, a semiconductor laser, an LED laser, an adjustable power laser or an adjustable wavelength laser.

7. The particle shooter system of claim 1, wherein the positioning mechanism comprises at least one coupling chosen from the electrostatic coupling and the electromagnetic coupling.

8. The particle shooter system of claim 1, wherein the positioning mechanism is the piezoelectric coupling.

9. The particle shooter system of claim 1, wherein the target comprises one or more materials chosen from graphene, a graphene sheet, a nanotube, a fullerene, a semiconductor, and a topological Insulator.

10. A particle shooter system, comprising:
a non-carbon topological insulator nanotube defining a bore extending between first and second ends thereof;
a particle shooter operably coupled with the first end of the non-carbon topological insulator nanotube, and configured to transmit a single particle through the bore of the non-carbon topological insulator nanotube;
a positioning mechanism operably coupled with the non-carbon topological insulator nanotube and configured to aim the non-carbon topological insulator nanotube at a target disposed proximal the second end thereof; and
one or more detection sensors for sensing a physical phenomenon that occurs when the particle hits the target, the detection sensors comprising at least one sensor chosen from an optical sensor, mechanical sensor, vibrational sensor, electrical sensor, heat-sensing sensor, electro-magnetic energy sensor, and movement sensor.

11. A particle shooter system, comprising:
a non-carbon topological insulator nanotube defining a bore extending between first and second ends thereof;
a particle shooter operably coupled with the first end of the non-carbon topological insulator nanotube, and configured to transmit a single particle through the bore of the non-carbon topological insulator nanotube; and
a positioning mechanism operably coupled with the non-carbon topological insulator nanotube and configured to aim the non-carbon topological insulator nanotube at a target disposed proximal the second end thereof;
wherein the particle shooter is configured to shoot a particle at a first power for positioning the non-carbon topological insulator nanotube, and wherein the particle shooter is configured to shoot one or more particles at a second power for displacing one or more particles in the target, the second power being higher than the first power.

12. A particle shooter system, comprising:
a non-carbon topological insulator nanotube defining a bore extending between first and second ends thereof;
a particle shooter operably coupled with the first end of the non-carbon topological insulator nanotube, and configured to transmit a single particle through the bore of the non-carbon topological insulator nanotube; and
a positioning mechanism operably coupled with the non-carbon topological insulator nanotube and configured to aim the non-carbon topological insulator nanotube at a target disposed proximal the second end thereof;
wherein the particle shooter comprises a first laser configured to shoot a particle at a first power for positioning the non-carbon topological insulator nanotube, and a second laser configured to shoot one or more particles at a second power to displace one or more particles in the target.

13. A method for aiming a particle shooter of a particle shooter system, the method comprising:
positioning a non-carbon topological insulator nanotube toward a target;

shooting a particle from the non-carbon topological insulator nanotube towards the target at a first power;
sensing a location hit by the particle after shooting; and
re-positioning the non-carbon topological insulator nanotube based on the location,
wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; and a positioning mechanism operably coupled with the non-carbon topological insulator nanotube and configured to aim the non-carbon topological insulator nanotube at a target disposed proximal the second end thereof, wherein the positioning mechanism comprises at least one coupling chosen from an electrostatic coupling, an electromagnetic coupling, and a piezoelectric coupling.

14. The method of claim 13, wherein the sensing the location hit by the particle includes detecting whether the particle hits a particle that is positioned on the target, travels through a space between particles in the target, or travels through a bond between particles in the target.

15. The method of claim 13, wherein the sensing includes computing the location hit by the particle.

16. The method of claim 13, wherein the particle is shot from a non-carbon topological insulator nanotube to another end of the non-carbon topological insulator nanotube via a laser.

17. The method of claim 13, further comprising the step of shooting a second particle from the non-carbon topological insulator nanotube towards the target at a second power after the non-carbon topological insulator nanotube has been aligned with the target, the second power being higher than the first power.

18. The method of claim 17, wherein the second particle hits a particle in the target and displaces the particle in the target.

19. The method of claim 17, wherein the second particle hits a particle in the target and replaces the particle in the target.

20. The method of claim 17, wherein the second particle hits a particle in the target and is deposited on the particle in the target.

21. The method of claim 17, further comprising shooting a plurality of particles at a third power that is higher than the first power, the plurality of particles hitting one or more particles in the target and being deposited on the target until one or more layers are formed on the target.

22. The method of claim 13, wherein the particle is a photon, an electron, a proton, an atom, an ion or a molecule.

23. The method of claim 13, wherein the non-carbon topological insulator nanotube is positioned to aim particles at a portion of the target chosen from a single atom, a bond between particles, space between particles and a molecule.

24. A method for additive/subtractive manufacturing comprising:
positioning a non-carbon topological insulator nanotube of a particle shooter system toward a target; and
shooting a particle down the non-carbon topological insulator nanotube at the target,
wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; and a positioning mechanism operably coupled with the non-carbon topological insulator nanotube and configured to aim the non-carbon topological insulator nanotube at a target disposed proximal the second end thereof, wherein the positioning mechanism comprises at least one coupling chosen from an electrostatic coupling, an electromagnetic coupling, and a piezoelectric coupling.

25. The method of claim 24, further comprising:
sensing a location hit by the particle after shooting;
if sensing indicates that the target was not directly hit, re-positioning the non-carbon topological insulator nanotube and repeat shooting a particle at a first power at the target and sensing where the particle hits with regard to the target; and
if sensing indicates that the target was directly hit, shooting a particle down the non-carbon topological insulator nanotube at a second power at the target so that the particle couples with the target to build a layer on the target, the second power being higher than the first power.

26. The method of claim 24, wherein the particle couples with the target.

27. The method of claim 26, wherein after the particle couples with the target, the method further comprises re-positioning the non-carbon topological insulator nanotube to a second position on the target and repeating the shooting step of claim 24.

28. The method of claim 26, further comprising repeating the step of claim 25 until a layer is formed.

29. The method of claim 27, further comprising repeating the step of claim 28 to form a plurality of layers on the target.

30. The method of claim 27, wherein the method is used for two dimensional or three dimensional printing.

31. A method for aiming a particle shooter of a particle shooter system, the method comprising:
positioning a non-carbon topological insulator nanotube toward a target;
shooting a particle from the non-carbon topological insulator nanotube towards the target at a first power;
sensing a location hit by the particle after shooting; and
re-positioning the non-carbon topological insulator nanotube based on the location,
wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; a positioning mechanism operably coupled with the non-carbon topological insulator nanotube and configured to aim the non-carbon topological insulator nanotube at a target disposed proximal the second end thereof; and one or more detection sensors for sensing a physical phenomenon that occurs when the particle hits the target, the detection sensors comprising at least one sensor chosen from an optical sensor, mechanical sensor, vibrational sensor, electrical sensor, heat-sensing sensor, electro-magnetic energy sensor, and movement sensor.

32. A method for aiming a particle shooter of a particle shooter system, the method comprising:

positioning a non-carbon topological insulator nanotube toward a target;

shooting a particle from the non-carbon topological insulator nanotube towards the target at a first power;

sensing a location hit by the particle after shooting; and re-positioning the non-carbon topological insulator nanotube based on the location, wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; and a positioning mechanism operably coupled with the non-carbon topological insulator nanotube and configured to aim the non-carbon topological insulator nanotube at a target disposed proximal the second end thereof; wherein the particle shooter is configured to shoot a particle at a first power for positioning the non-carbon topological insulator nanotube, and wherein the particle shooter is configured to shoot one or more particles at a second power for displacing one or more particles in the target, the second power being higher than the first power.

33. A method for aiming a particle shooter of a particle shooter system, the method comprising:

positioning a non-carbon topological insulator nanotube toward a target;

shooting a particle from the non-carbon topological insulator nanotube towards the target at a first power;

sensing a location hit by the particle after shooting; and re-positioning the non-carbon topological insulator nanotube based on the location, wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; and a positioning mechanism operably coupled with the non-carbon topological insulator nanotube and configured to aim the non-carbon topological insulator nanotube at a target disposed proximal the second end thereof; wherein the particle shooter comprises a first laser configured to shoot a particle at the first power for positioning the non-carbon topological insulator nanotube, and a second laser configured to shoot one or more particles at a second power to displace one or more particles in the target.

34. A method for additive/subtractive manufacturing comprising:

positioning a non-carbon topological insulator nanotube of a particle shooter system toward a target; and shooting a particle down the non-carbon topological insulator nanotube at the target, wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; a positioning mechanism operably coupled with the non-carbon topological insulator nanotube and configured to aim the non-carbon topological insulator nanotube at a target disposed proximal the second end thereof; and one or more detection sensors for sensing a physical phenomenon that occurs when the particle hits the target, the detection sensors comprising at least one sensor chosen from an optical sensor, mechanical sensor, vibrational sensor, electrical sensor, heat-sensing sensor, electro-magnetic energy sensor, and movement sensor.

35. A method for additive/subtractive manufacturing comprising:

positioning a non-carbon topological insulator nanotube of a particle shooter system toward a target; and shooting a particle down the non-carbon topological insulator nanotube at the target, wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; and a positioning mechanism operably coupled with the non-carbon topological insulator nanotube and configured to aim the non-carbon topological insulator nanotube at a target disposed proximal the second end thereof; wherein the particle shooter is configured to shoot a particle at a first power for positioning the non-carbon topological insulator nanotube, and wherein the particle shooter is configured to shoot one or more particles at a second power for displacing one or more particles in the target, the second power being higher than the first power.

36. A method for additive/subtractive manufacturing comprising:

positioning a non-carbon topological insulator nanotube of a particle shooter system toward a target; and shooting a particle down the non-carbon topological insulator nanotube at the target, wherein the particle shooter system comprises: the non-carbon topological insulator nanotube, the non-carbon topological insulator nanotube defining a bore extending between first and second ends thereof; a particle shooter operably coupled with the first end of the non-carbon topological insulator nanotube, and configured to transmit a single particle through the bore of the non-carbon topological insulator nanotube; and a positioning mechanism operably coupled with the non-carbon topological insulator nanotube and configured to aim the non-carbon topological insulator nanotube at a target disposed proximal the second end thereof; wherein the particle shooter comprises a first laser configured to shoot a particle at a first power for positioning the non-carbon topological insulator nanotube, and a second laser configured to shoot one or more particles at a second power to displace one or more particles in the target.

* * * * *

UNITED STATES PATENT AND TRADEMARK OFFICE
CERTIFICATE OF CORRECTION

PATENT NO. : 10,987,825 B2
APPLICATION NO. : 15/815600
DATED : April 27, 2021
INVENTOR(S) : Jeffrey H. Hunt et al.

Page 1 of 1

It is certified that error appears in the above-identified patent and that said Letters Patent is hereby corrected as shown below:

In the Claims

Column 12, Line 10, in Claim 9, delete "Insulator", and insert therefor --insulator--.

Signed and Sealed this
Fourth Day of January, 2022

Drew Hirshfeld
*Performing the Functions and Duties of the
Under Secretary of Commerce for Intellectual Property and
Director of the United States Patent and Trademark Office*